United States Patent
Lungu-Stan et al.

(10) Patent No.: US 12,437,505 B2
(45) Date of Patent: Oct. 7, 2025

(54) GENERATING TEMPLATES USING STRUCTURE-BASED MATCHING

(71) Applicant: Adobe Inc., San Jose, CA (US)

(72) Inventors: Vlad-Constantin Lungu-Stan, Buzau (RO); Ionuț Mironică, Bucharest (RO); Oliver Brdiczka, San Jose, CA (US); Alexandru Vasile Costin, Monte Sereno, CA (US)

(73) Assignee: Adobe Inc., San Jose, CA (US)

( * ) Notice: Subject to any disclaimer, the term of this patent is extended or adjusted under 35 U.S.C. 154(b) by 517 days.

(21) Appl. No.: 17/965,291

(22) Filed: Oct. 13, 2022

(65) Prior Publication Data
US 2024/0127577 A1    Apr. 18, 2024

(51) Int. Cl.
G06V 10/00 (2022.01)
G06T 11/60 (2006.01)
G06V 10/74 (2022.01)

(52) U.S. Cl.
CPC ............ G06V 10/761 (2022.01); G06T 11/60 (2013.01)

(58) Field of Classification Search
CPC .............. G06V 10/761; G06V 10/82; G06V 30/18181; G06V 30/19127
See application file for complete search history.

(56) References Cited

U.S. PATENT DOCUMENTS

| | | | | |
|---|---|---|---|---|
| 8,391,642 B1 * | 3/2013 | Petruszka | ............ | G06V 40/173 382/285 |
| 10,614,268 B1 * | 4/2020 | Howard | ................ | G06T 11/60 |
| 10,762,301 B1 * | 9/2020 | Johnson | .................. | G06F 40/40 |
| 11,210,572 B2 * | 12/2021 | Divakaran | ....... | G06V 30/19173 |
| 11,308,141 B2 * | 4/2022 | Ravindran | ............ | G06F 16/353 |
| 11,586,829 B2 * | 2/2023 | Mishra | .................... | G06F 40/30 |
| 11,605,019 B2 * | 3/2023 | Aggarwal | ........ | G06V 30/19147 |
| 11,727,210 B2 * | 8/2023 | Wang | .................... | G06F 40/205 704/9 |
| 2017/0371856 A1 * | 12/2017 | Can | .................. | G06V 30/19173 |

(Continued)

FOREIGN PATENT DOCUMENTS

| | | | | |
|---|---|---|---|---|
| WO | WO-2019052917 A1 * | 3/2019 | ............. | G06F 16/51 |
| WO | WO-2020210867 A1 * | 10/2020 | ......... | G06F 16/9577 |

OTHER PUBLICATIONS

Caropreso, M.F., et al, "Automatic generation of narrative content for digital games", 2009 International Conference on Natural Language Processing and Knowledge Engineering (2009, pp. 1-8). (Year: 2009).*

(Continued)

*Primary Examiner* — Laurie A Ries
(74) *Attorney, Agent, or Firm* — FIG. 1 Patents

(57) ABSTRACT

In implementations of systems for generating templates using structure-based matching, a computing device implements a template system to receive input data describing a set of digital design elements. The template system represents the input data as a sentence in a design structure language that describes structural relationships between design elements included in the set of digital design elements. An input template embedding is generated based on the sentence in the design structure language. The template system generates a digital template that includes the set of digital design elements for display in a user interface based on the input template embedding.

20 Claims, 12 Drawing Sheets

(56) References Cited

U.S. PATENT DOCUMENTS

| | | | | |
|---|---|---|---|---|
| 2018/0025252 | A1* | 1/2018 | Konishi | G06V 10/7635 |
| | | | | 382/216 |
| 2018/0268244 | A1* | 9/2018 | Moazzami | G06V 20/176 |
| 2020/0210467 | A1* | 7/2020 | Ravindran | G06F 16/9024 |
| 2021/0397778 | A1* | 12/2021 | Kraus | G06F 40/106 |
| 2022/0036127 | A1* | 2/2022 | Lin | G06T 11/00 |
| 2022/0092108 | A1* | 3/2022 | Collomosse | G06F 16/5838 |
| 2022/0121702 | A1* | 4/2022 | Kale | G06N 3/04 |
| 2022/0391433 | A1* | 12/2022 | Maheshwari | G06N 3/0464 |
| 2023/0042221 | A1* | 2/2023 | Xu | G06N 3/047 |
| 2023/0058082 | A1* | 2/2023 | Kim | G06V 10/7788 |
| 2023/0103305 | A1* | 4/2023 | Xu | G06F 40/205 |
| | | | | 382/156 |
| 2023/0154221 | A1* | 5/2023 | Gu | G06V 30/414 |
| | | | | 382/156 |
| 2023/0326178 | A1* | 10/2023 | Marri | G06N 3/088 |
| | | | | 382/100 |
| 2024/0078376 | A1* | 3/2024 | Li | G06F 40/169 |
| 2025/0077568 | A1* | 3/2025 | Chakiat | H04N 21/251 |
| 2025/0078341 | A1* | 3/2025 | Phogat | G06T 11/60 |
| 2025/0131460 | A1* | 4/2025 | Mueller | G06T 11/001 |

OTHER PUBLICATIONS

Hassani, Kaveh, et al, "Visualizing Natural Language Descriptions: a Survey", ACM Computing Surveys, vol. 49 Issue 1, Article No. 17, Jun. 2016, pp. 1-34. (Year: 2016).*

Gowtham, M., et al, "Semantic Query-Featured Ensemble Learning Model for SQL-Injection Attack Detection in Io T-Ecosystems", IEEE Transactions on Reliability (vol. 71, Issue: 2, 2022, pp. 1057-1074). (Year: 2022).*

Pardhi, Vineet, et al, "Generating a Scene from Text for Smart Education", IEEE International Conference on Communication Information and Computing Technology (ICCICT), Jun. 25-27, 2021, pp. 1-6. (Year: 2021).*

* cited by examiner

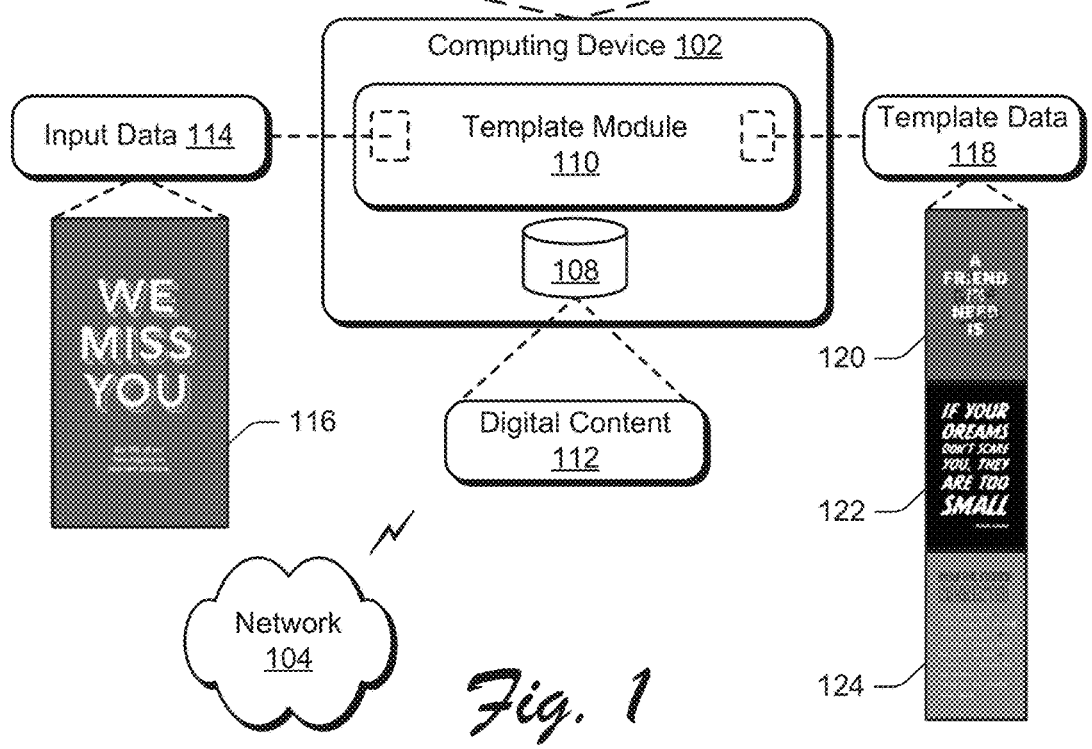
Fig. 1

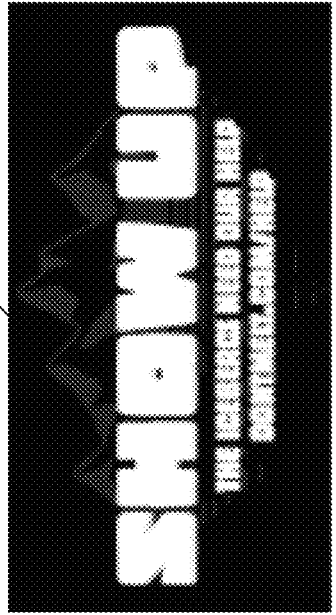

| Language Element | Format | Description |
|---|---|---|
| Start | <s> | |
| Aspect Ratio | <ar> | Facebook/instagram story/ letter/poster/A4/ etc. |
| Intent categories | <categories>...catx...</categories> | Flyer, instagram-post, instagram-story, logo, youtube etc. |
| Background | <bk> | Background image and color |
| Number of elements | <num_elem>x, y, z | Number of images, text controls and svg shapes |
| Input end | <ie> | |
| Group | <gr> | Groups content with similar content |
| Text | <text><type><charcnt> | type: Title, content, call to action, person name, phone number, calendar, date or time, web address, social media reference, place, email, address<br>charcnt: number of characters |
| Shape | <shape><type> | Shape types: line, frame, icon, backing shape |
| Image | <image><type> | Image Types: texture, design asset, cutout, content, frame, shape crop, backing shape, background |
| Group end | </gr> | |
| End | <e> | |

<s><categories>flyer</categories><bk_col><num_elem>1 2 0<ie>
<image><background><text><call to action><charcount:1><text><web address><charcount:3><e>

Fig. 3

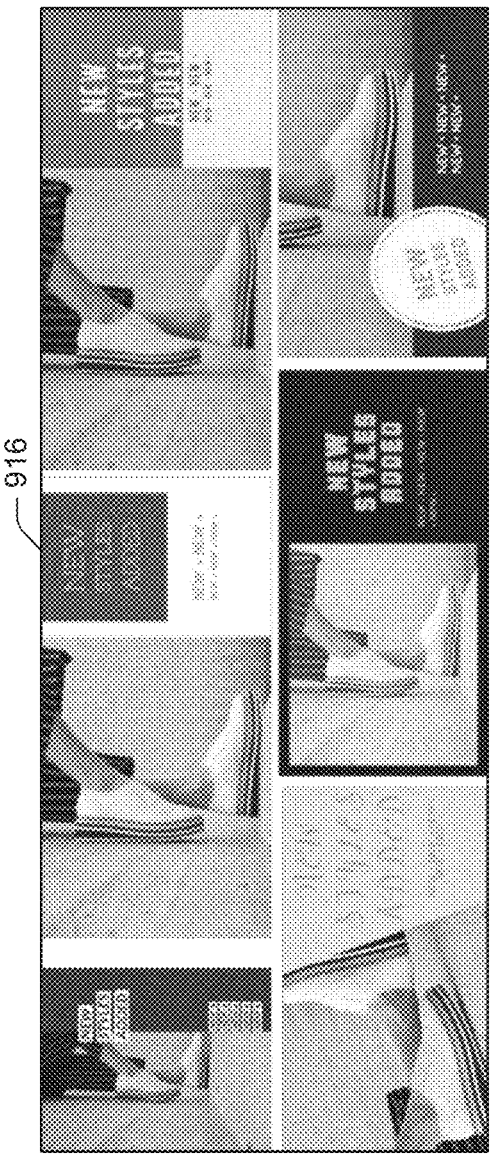
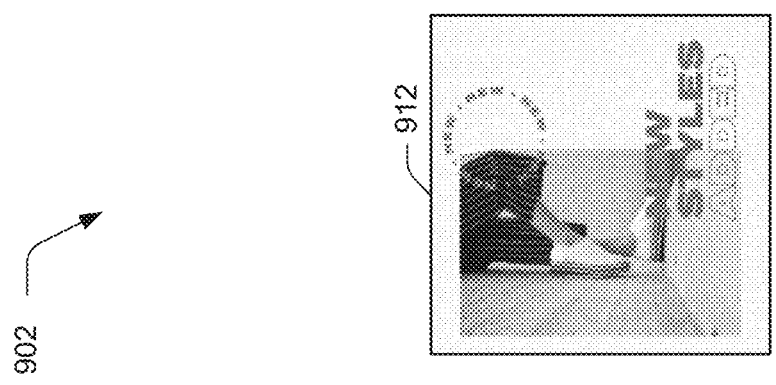
Fig. 9B

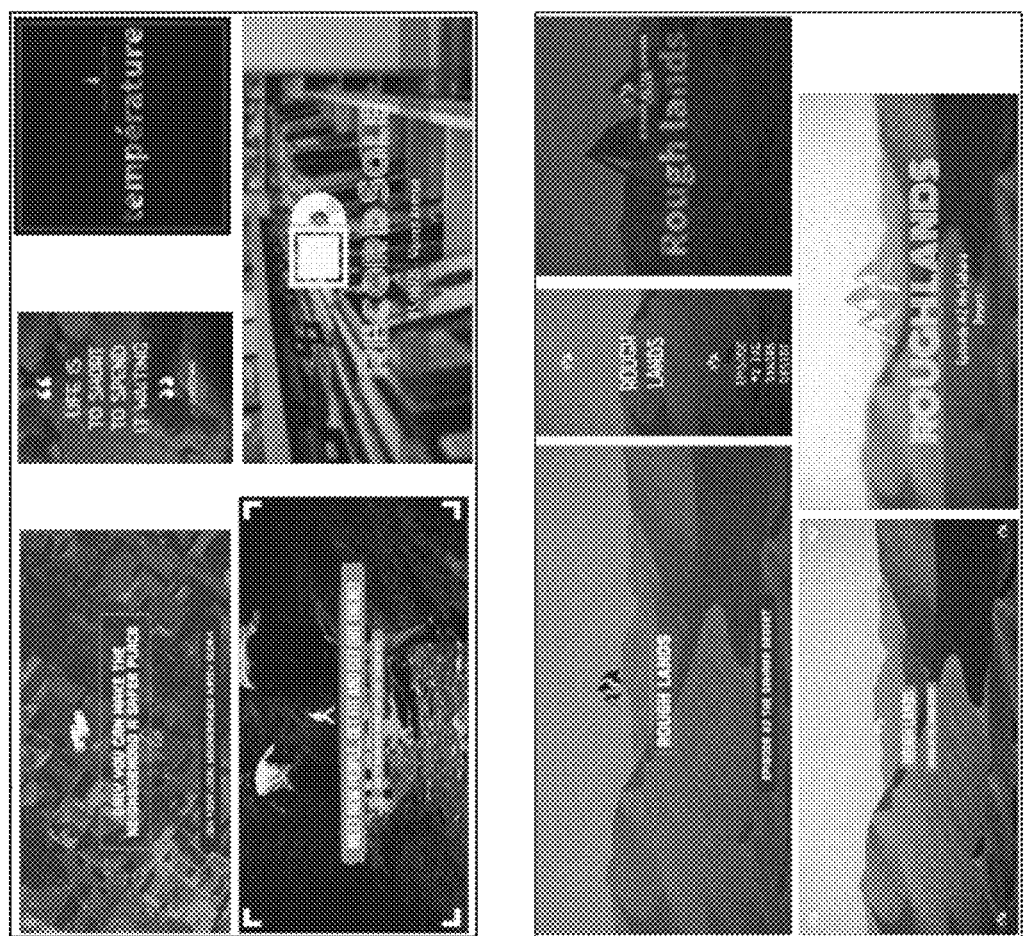
Fig. 9C

GENERATING TEMPLATES USING STRUCTURE-BASED MATCHING

BACKGROUND

A digital template is typically created by a digital artist as including example content arranged in a visually pleasing layout or structure. The digital template is made available to users, for example, as part of a database of digital templates available via a network. A user identifies the digital template (e.g., by searching the database), and the user completes the digital template by replacing the example content with the user's content. For instance, the completed digital template includes the user's content arranged in the visually pleasing layout even though the user may not have been capable of creating the visually pleasing layout that was created by the digital artist.

SUMMARY

Techniques and systems for generating templates using structure-based matching are described. In an example, a computing device implements a template system to receive input data describing a set of digital design elements. Examples of design elements in the set include digital images, text elements, scalable vector graphics, etc. In some examples, the input data describes an input digital template having the set of digital design elements.

The template system represents the input data as a sentence in a design structure language that describes structural relationships between the design elements included in the set of digital design elements. In one example, the template system generates an input template embedding based on the sentence in the design structure language. A digital template is generated that includes the set of digital design elements for display in a user interface based on the input template embedding.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ digital systems and techniques for generating templates using structure-based matching as described herein.

FIG. 3 illustrates a representation of input data which is represented as a sentence in a design structure language.

FIGS. 9A, 9B, and 9C illustrate examples of templates generated using structure-based matching.

DETAILED DESCRIPTION

Overview

Figure 2:
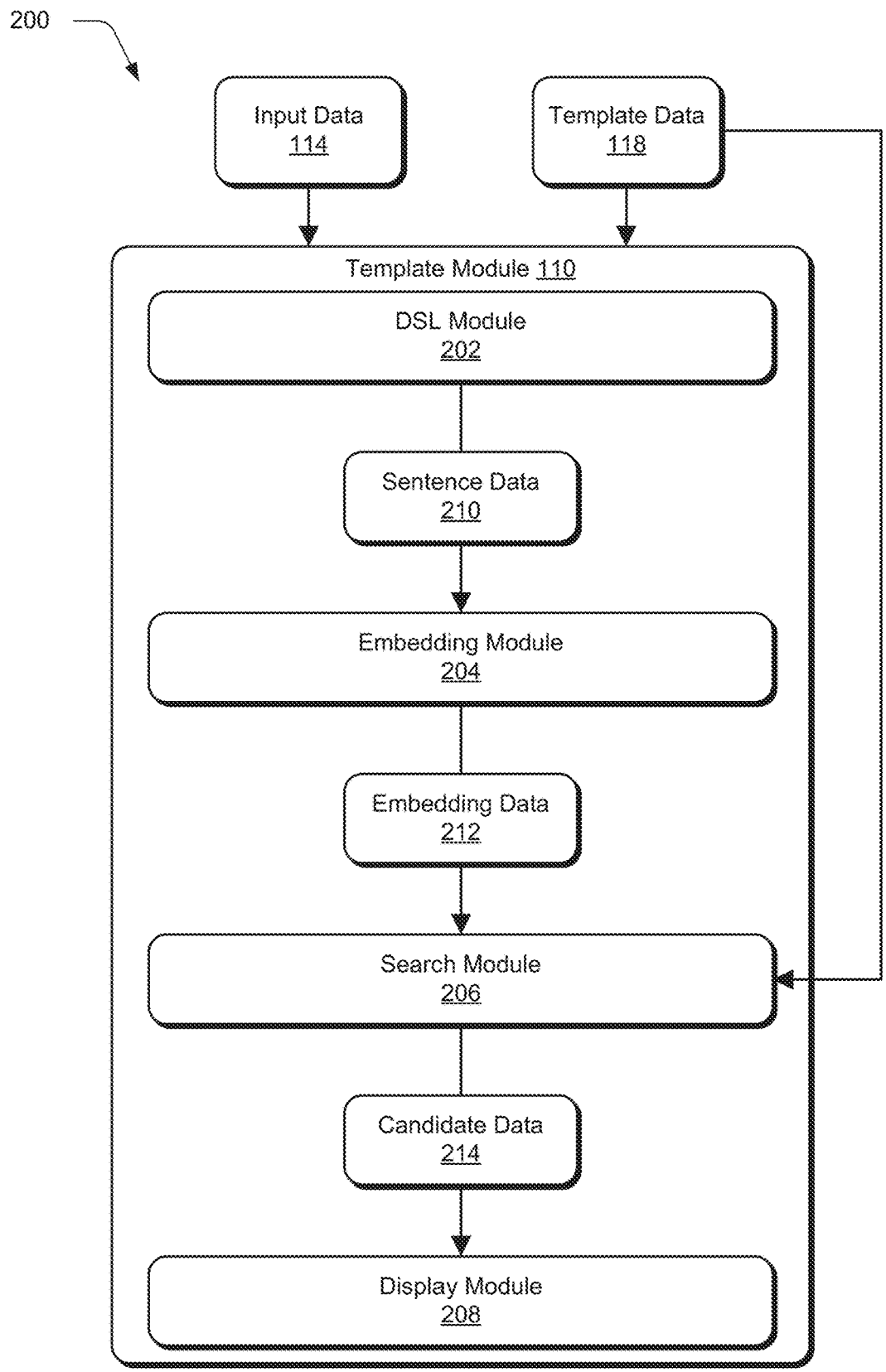
FIG. 2 depicts a system in an example implementation showing operation of a template module for generating templates using structure-based matching.

Conventional systems for identifying templates included in a database of thousands of templates are limited to searches using keywords and categories. For instance, a user attempting to identify templates to receive a set of digital design elements (e.g., digital images, text elements, scalable vector graphics, etc.) performs keyword searches for the templates which return hundreds (or thousands) of results. Alternatively, the user manually browses through hundreds (or thousands) of templates included in a category that is related to the set of digital design elements. If the user is able to identify a particular template having example design elements arranged in a visually pleasing layout to receive the set of digital design elements, then the user manually modifies design elements included in the set (e.g., crops or resizes digital images) to replace the example design elements in the particular template which is inefficient and prone to user error.

In order to overcome these limitations, techniques and systems for generating templates using structure-based matching are described. In an example, a computing device implements a template system to receive input data describing a set of digital design elements such as text elements, digital images, scalable vector graphics, etc. For example, the input data describes a digital template having the set of digital design elements arranged in a structure or layout which is not visually pleasing to a user.

In order to identify templates included in a collection of digital templates having example design elements arranged in visually pleasing layouts and to receive the set of digital design elements, the user interacts with an input device (e.g., a mouse, a touchscreen, a stylus, a keyboard, etc.) to transmit the input data to the template system via a network. For instance, the collection of templates includes thousands of different digital templates such as templates for flyers, menus, resumes, business cards, greeting cards, invitations, brochures, etc. The template system represents the input data as a sentence in a design structure language that describes structural relationships between design elements included in the set of digital design elements. Examples of these structural relationships include semantic information about the design elements, overlapping information, and whether or not ones of the design elements are members of a group of other design elements.

The template system combines tokens of the sentence in the design structure language, types of the tokens, and Z-indexes of design elements in the digital template associated with the tokens as an input to a machine learning model. The template system implements the machine learning model to generate an embedding in an embedding space that corresponds to the digital template based on the combined input. For example, the machine learning model includes Bidirectional Encoder Representations from Transformers, and the machine learning model is trained on training data to generate embeddings corresponding to digital templates such that embeddings corresponding to digital templates having a similar structure (e.g., same types of design elements arranged in similar configurations) are separated by a relatively small distance in the embedding space.

The template system computes distances between the embedding that corresponds to the digital template input and embeddings described by template data that correspond to digital templates included in the collection of templates. For example, the embeddings described by the template data are also generated using the machine learning model trained on the training data. The template system identifies a subset of the embeddings described by the template data based on the computed distances.

In an example, the template system constructs a complete bipartite graph for the digital template input and digital templates corresponding to embeddings included in the subset of the embeddings. The template system performs minimum cost bipartite matching on these graphs to generate digital templates including the set of digital design elements of the digital template input arranged in structural layouts of the digital templates corresponding to the embeddings included in the subset. For example, the template system generates the digital templates for display in a user interface as having the set of digital design elements arranged in layouts that are visually pleasing to the user. In one example, these layouts are created by digital artists for templates in the collection of templates.

Unlike conventional systems which are limited to searching for templates to receive the set of digital design elements included in the digital template input (e.g., which is not visually pleasing to the user) based on keywords and/or categories, the described systems are capable of automatically generating templates having the set of digital design elements arranged in aesthetically pleasing layouts (e.g., created by digital artists). Because the generated digital templates also depict the set of digital design elements modified for inclusion in the visually pleasing layouts, it is possible for the user to visualize how the set of digital design elements appears in the generated templates which is not possible using conventional systems. Moreover, computing distances between the embeddings is computationally efficient such that the described systems are capable of identifying the subset and generating the digital templates in substantially real time. As a result of this efficiency, the described systems are implementable to search large template databases (e.g., including thousands of templates) to generate templates with visually pleasing layouts in online applications via the network.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. As shown, the computing device 102 includes a storage device 108 and a template module 110. The storage device 108 is illustrated to include digital content 112 such as electronic documents, digital artwork, digital videos, etc.

The template module 110 is illustrated as having, receiving, and/or transmitting input data 114 which describes a set of digital design elements such as digital images, glyphs of text, scalable vector graphics, etc. Consider an example in which a user interacts with an input device (e.g., a stylus, a mouse, a touchscreen, a keyboard, etc.) relative to a user interface of an application for creating/editing digital content to generate the input data 114. In this example, the user manipulates the input device to define the set of digital design elements by modifying a digital template 116 (or creating the digital template 116) which has a solid colored background and two text elements with example text.

For instance, the user modifies the example text of one of the text elements included in the digital template 116 to have text that states "WE MISS YOU" and modifies the example text of other text element to have text that states "Get $10 off and free shipping on your next purchase." The user is pleased with the content included in the digital template 116 (e.g., the substance of the text); however, an overall appearance of the content within the digital template 116 (e.g., a layout of the text or a style of the text) is not visually pleasing to the user. In order to improve the visual appearance of the digital template 116, the user interacts with the input device to transmit the input data 114 to the template module 110 via the network 104.

The template module 110 receives and processes the input data 114 to generate a digital template that includes the set of digital design elements described by the input data 114. To do so in one example, the template module 110 represents the digital template 116 as a sentence in a design structure language which describes structural relationships between the two text elements and the solid colored background of the digital template 116. For example, the sentence in the design structure language includes a first sequence for metadata of the digital template 116 and a second sequence for the content of the digital template 116.

The template module 110 generates an embedding that corresponds to the digital template 116 by processing the sentence in the design structure language using a machine learning model. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example, the machine learning model includes Bidirectional Encoder Representations from Transformers trained on training data to receive an input embedding and generate output tokens based on the input embedding. The input embedding is a sum of multiple embeddings including tokens of the sentence in the design structure language. For example, rather than averaging the output tokens, the template module 110 generates the embedding that corresponds to the digital template 116 using a Vector of Locally Aggregated Descriptors which captures distributions of the output tokens.

The template module 110 then compares the embedding that corresponds to the digital template 116 with embeddings that correspond to additional digital templates described by template data 118 which is accessible to the template module 110 and/or the computing device 102 via the network 104. In some examples, the template module 110 generates the embeddings described by the template data 118 by representing the additional digital templates as sentences in the design structure language, and then processing the sentences using the machine learning model trained on the training data. For example, the template module 110 uses the Vector of Locally Aggregated Descriptors to combine output tokens generated by the machine learning model based on the sentences in the design structure language. Thus, in these examples, the embeddings described by the template data 118 are generated in a same manner as the embedding that corresponds to the digital template 116.

Consider an example in which the template data 118 describes embeddings that correspond to thousands of different digital templates included in a template repository (e.g., a database of digital templates). In this example, the template repository includes a wide variety of digital templates such as editable templates for flyers, menus, resumes, posts, logos, thumbnails, collages, business cards, greeting cards, invitations, brochures, album covers, worksheets, book covers, etc. The template module 110 computes distances between the embedding that corresponds to the digital template 116 and the embeddings described by the template data 118 in an embedding space or a latent space.

In some examples, a distance in the embedding space between a first embedding corresponding to a first digital template and a second embedding corresponding to a second digital template is relatively small if the first and second digital templates are structurally similar (e.g., include the same types of design elements arranged in similar configurations). Conversely, the distance in the embedding space between the first embedding and the second embedding is relatively large if the first and second digital templates are structurally dissimilar (e.g., include different types of design elements arranged in dissimilar configurations). The template module 110 identifies a subset of digital templates 120-124 from the thousands of templates included in the template repository that correspond to embeddings described by the template data 118.

For example, the template module 110 identifies the digital templates 120-124 as corresponding to embeddings described by the template data 118 which are separated from the embedding that corresponds to the digital template 116 by a relatively small distance in the embedding space. Because the template module 110 identifies the digital templates 120-124 in this way, each of the digital templates 120-124 is structurally similar to the digital template 116. For instance, each of the digital templates 120-124 includes two text elements and a solid colored background.

Consider an example in which the thousands of templates included in the template repository that correspond to embeddings described by the template data 118 are created by digital artists to be aesthetically pleasing. In this example, the digital templates 120-124 are usable to improve the visual appearance of the digital template 116 by replacing example content included in the digital templates 120-124 with the content included in the digital template 116 (e.g., the substance of the text). To do so in one example, the template module 110 computes translation scores between design elements (e.g., digital images, glyphs of text, scalable vector graphics, etc.) included in the digital templates 120-124 and the design elements included in the digital template 116.

In one example, the translation scores penalize mismatches between different types of design elements and differences between design elements of a same type such as differences in bounding box sizes, different numbers of characters included in text elements, differences in aspect ratios of digital images, and so forth. The template module 110 computes a mapping between the design elements included in the digital template 116 and the design elements included in each of the digital templates 120-124 to minimize a sum of the corresponding translation scores. For example, the template module 110 constructs a complete bipartite graph for the digital template 116 and each of the digital templates 120-124 and determines the corresponding mappings using a matching algorithm, e.g., the Jonker-Volgenant algorithm.

After computing the mappings between the design elements included in the digital template 116 and the design elements included in each of the digital templates 120-124, the template module 110 generates digital templates 126-130 based on the mappings which are displayed in a user interface 132 of the display device 106. As shown, each of the digital templates 126-130 includes the text that states "WE MISS YOU" and the text that states "Get $10 off and free shipping on your next purchase." Accordingly, each of the digital templates 126-130 includes the content included in the digital template 116 (e.g., the substance of the text) in a visually pleasing layout of one of the corresponding digital templates 120-124. For instance, digital template 126 has a style/layout of digital template 120; digital template 128 has a style/layout of digital template 122; and digital template 130 has a style/layout of digital template 124.

For example, the user interacts with the input device relative to the user interface 132 to select one of the digital templates 126-130 for use as an alternative to using the digital template 116 and/or to edit one of the digital templates 126-130. This is not possible using conventional systems such as rule-based recommendation systems which are not capable of identifying the digital templates 120-124 from the thousands of digital templates that are included in the template repository. Conventional systems are also not capable of generating the digital templates 126-130 as having the content included in the digital template 116.

FIG. 2 depicts a system 200 in an example implementation showing operation of a template module 110. The template module 110 is illustrated to include a design structure language module 202, an embedding module 204, a search module 206, and a display module 208. For example, the template module 110 receives the input data 114 describing a set digital design elements and the template data 118 describing embeddings corresponding to each of the thousands of digital templates included in the template repository.

FIG. 3 illustrates a representation 300 of input data which is represented as a sentence in a design structure language. The design structure language module 202 receives the input data 114 as describing an input digital template 302. As shown in the representation 300, the input digital template 302 includes two text elements, a digital image, and a solid colored background. The first text element has text that states "SHOW UP" and the second text element has text that states "THE ICEBERGS NEED OUR HELP DONTMELT.COM/HELP." The digital image depicts an iceberg, and the digital image is below the first and second text elements in a Z-index of the design elements included in the input digital template 302.

The design structure language module 202 processes the input data 114 to generate sentence data 210. To do so in one example, the design structure language module 202 leverages a design structure language 304 to represent the input digital template 302 as a sentence 306 in the design structure language 304. The sentence 306 includes a sequence corresponding to metadata of the input digital template 302 and a sequence corresponding to content of the input digital template 302. In an example, the design structure language 304 encodes semantic information about design elements in a <type> format, and the design structure language 304 encodes group membership for sequences of design elements using pairs of tokens corresponding to a start and an end of a group.

As shown in the sentence 306, an intent of the input digital template 302 is encoded as "flyer;" the digital image is classified as "background;" the first text element is classified as "call to action;" and the second text element is classified as "web address." A number of characters included in the first text element maps to bin "1" which represents a first range of character numbers (e.g., 1 to 10) and a number of characters included in the second text element maps to bin "3" which represents a second range of character numbers (e.g., 21 to 30). In an example, the design structure language module 202 generates the sentence data 210 as describing the sentence 306 that represents the input digital template 302 in the design structure language 304.

Figure 4:
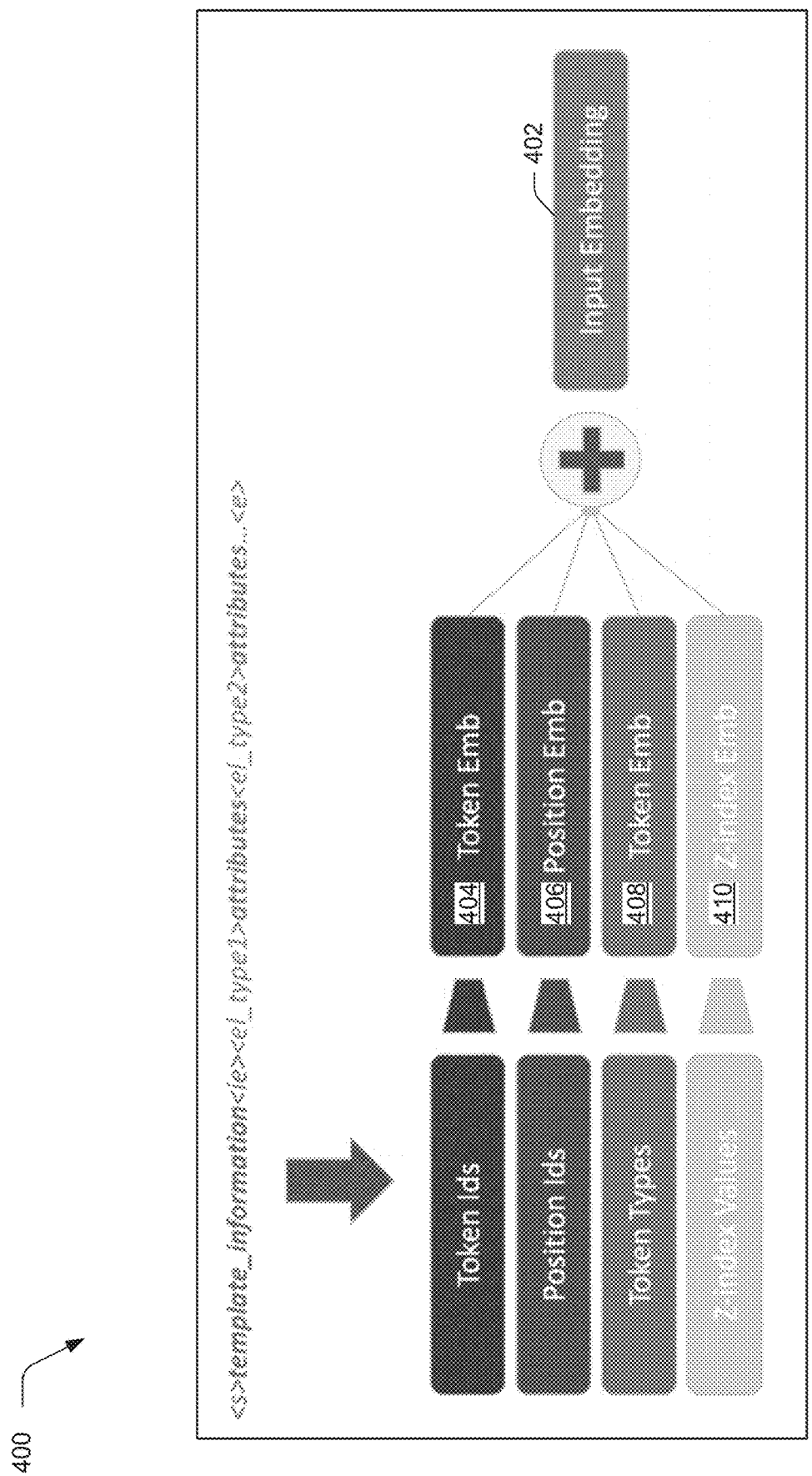
FIG. 4 illustrates a representation of an input to a matching network.

The embedding module 204 receives and processes the sentence data 210 to generate embedding data 212. FIG. 4 illustrates a representation 400 of an input to a matching network. The input is an input embedding 402 which is computed as a sum of four types of embeddings. For example, the four types of embeddings are token embeddings 404, position embeddings 406, token type embeddings 408, and Z-index embeddings 410. All four types of embeddings are trainable such that the trained embeddings map to a same embedding space or latent space.

The token embeddings 404 are embeddings of design structure language tokens included in the sentence 306 and the position embeddings 406 are indices of the design structure language tokens within the sentence 306. The token type embeddings 408 are embeddings of categories of the design structure language tokens in which 0 corresponds to a metadata token; 1 corresponds to a semantic information token; 2 corresponds to an element content type token; and 3 corresponds to a character count token. The Z-index embeddings 410 are embeddings of depth layers of the design elements which provide information about structure and overlaps. For example, without the Z-index embeddings 410 the token for the first text element follows the token for the digital image in the sentence 306 which is does not describe a relationship between the first text element and the digital image in the input digital template 302. However, with the Z-index embeddings 410 the relationship between the first text element and the digital image is described by relative depths of the first text element and the digital image such that it is possible to ascertain that the first text element overlaps the digital image in the input digital template 302.

Figure 5:
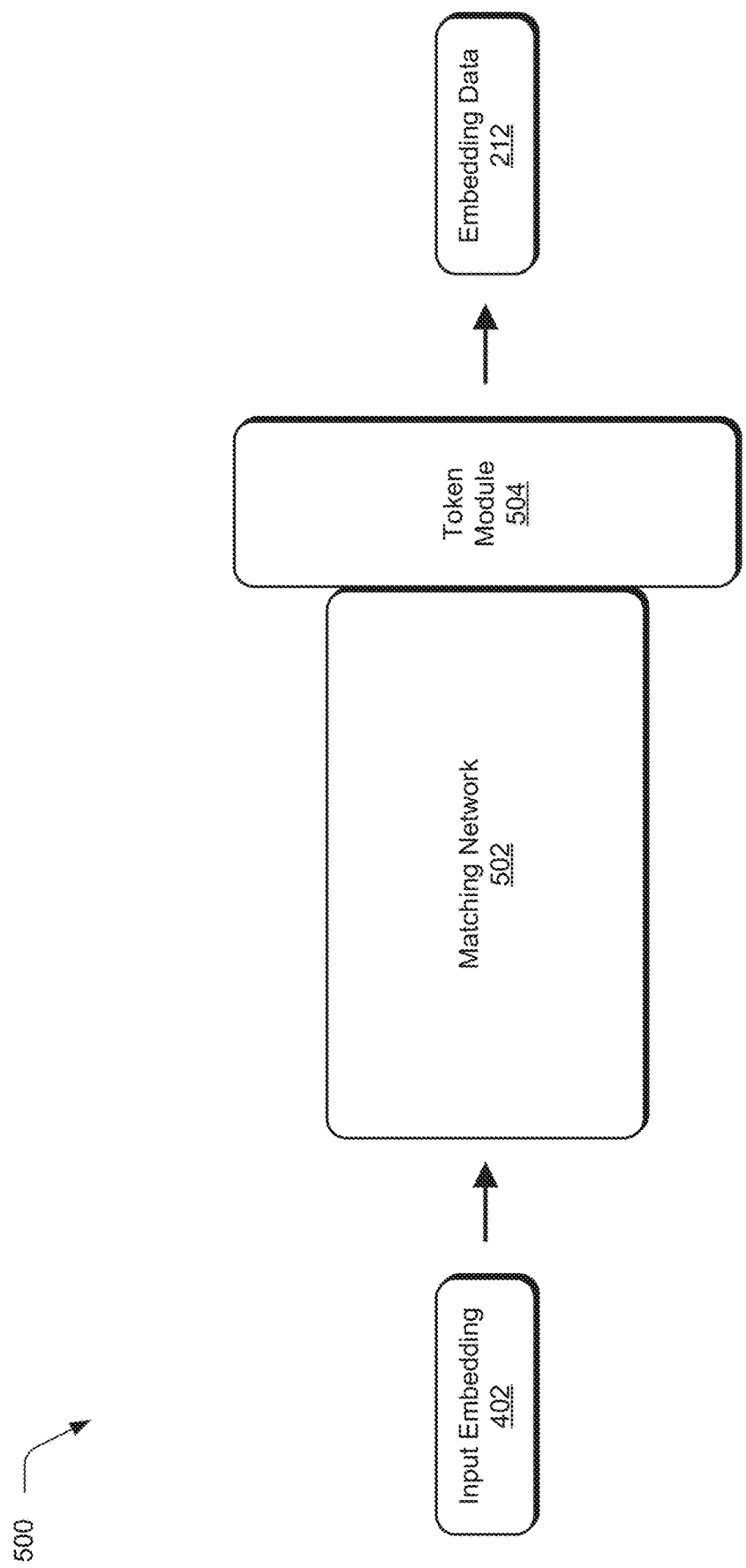
FIG. 5 illustrates a representation of generating embedding data using a matching network.

FIG. 5 illustrates a representation 500 of generating embedding data using a matching network. The representation 500 includes the input embedding 402, a matching network 502, and a token module 504. For example, the matching network 502 includes a machine learning model, and the machine learning model includes Bidirectional Encoder Representations from Transformers. The embedding module 204 trains the matching network 502 on training data to receive the input embedding 402 and generate output tokens based on the input embedding 402.

To do so in one example, the embedding module 204 masks input tokens of the design structure language 304 and corresponding Z-indices described by the training data. For example, the embedding module 204 masks the input tokens in the design structure language 304 randomly. For each randomly masked input token, the embedding module 204 also masks all Z-indices of a design element that includes the masked input token. Formally, if a design element A spans tokens [i . . . j], the embedding module 204 masks tokens $t_k$, $i \leq k \leq j$ and also masks all $z_p$, $p \in [i,j]$. Using this masking procedure causes the matching network 502 to learn and understand overlapping context instead of naively predicting neighboring Z-indices.

For example, the embedding module 204 includes all of the digital templates (except for a test set) included in the template repository as part of the training data which the embedding module 204 masks to train the matching network 502 to generate output tokens. Although the template repository includes thousands of digital templates, the embedding module 204 also augments the training data in some examples. Consider an example in which design element $E_a$ has a layer identifier $Lid_a$ and design element $E_b$ has a layer identifier $Lid_b$. If $E_a$ and $E_b$ overlap, $E_a$ is displayed over $E_b$ iff $L_{id\_a} > L_{id\_b}$.

Even if not all elements overlap, the linear ordering is utilized because it does not change a result (e.g., a final visual appearance of the elements is not changed). However, this linear representation enforces a non-existing ordering constraint. For instance, the first text element is ordered before the second text element in the Z-index of the design elements included in the input digital template 302; however, ordering the second text element before the first text element in the Z-index does not change a visual appearance of the input digital template 302. Because of this, the embedding module 204 determines a permutation 7 to shuffle input elements while keeping a same result. To do so in one example, the embedding module 204 constructs a directed graph based on overlapping design elements which defines the Z-indexing of the design elements.

For example, a Z-index of node A is representable as:

$$z(A)=1+\max(zO_a(A))$$

where: $zO_a$ represents Z values of elements that A overlaps; and based on the Z-index and by definition, node A is parent to node B if $z(B) >= z(A)+1$ and there is overlapping between them.

However, using the above definition, scenarios are possible in which a node has more than one parent. To facilitate the shuffling, the embedding module 204 transforms the directed graph into a tree by condensing subgraphs that violate the tree structure into tree nodes. Obtaining the permutation π is accomplished by performing a randomized depth first traversal of the tree. For example, when a condensed node is reached, a randomized topological sorting is performed by shuffling adjacency lists of the nodes. A virtual root is added to the tree, linking all design elements that have the Z-index 0 (only background is behind these design elements).

In some examples, the embedding module 204 condenses the nodes using a message-passing algorithm. In these examples, each tree-problem node that has more than one parent and violates the tree property sends a unique message to each of its parents. These messages are propagated in the graph in a bottom-up fashion. A node becomes condensed if it collects all messages from all its tree-problem descendants. In one example, this is representable as:

```
def get Ztree(tree):
    q ← PriorityQueue( )
    for each node in tree:
        if len(node.parents) > 1:
            q.insert((node.z__idx,node))
            node.tree__problem = true
            node.probl__children = set(node)
    while not q.empty:
        node ← q.pop( )
        if node.messages == sum(len(node.problematic__children.parents)):
            node.condensed = true
        else:
            for each parent of node:
                messages ← node.messages
                if node.tree__problem:
                    messages.add(tuple(node,parent))
                parent.messages.union(messages)
                parent.problematic__children.union(node.problematic__children)
                q.insert((node.z__idx,node))
```

Since the embedding module 204 obtains the training data describing embeddings corresponding to the templates included in the template repository in an unsupervised manner, these embeddings are alterable using loss functions. In general, language models leverage a classification loss (e.g., a cross-entropy loss) that considers one target as a training goal and all mistakes are equally undesirable. However, for generating templates using structure-based matching, some mistakes are more undesirable than other mistakes. For instance, mistaking a digital image as a scalable vector graphic (e.g., a shape) is more desirable than mistaking the digital image as text. Similarly, mistaking a character count that maps to bin 1 as mapping to bin 2 is more desirable than mistaking the character count that maps to bin 1 as mapping to bin 9. The embedding module 204 models these inductive biases by adding two regression-style loss functions which are used concurrently with cross-entropy loss of masked tokens and of the masked Z-indices. In an example, the embedding module 204 models the inductive biases by minimizing a loss function that penalizes incorrect predictions of digital images as text more than incorrect predictions of digital images as scalable vector graphics. A final loss is representable as:

$$L = w_1 L_{MLM} + w_2 L_{charcnt} + w_3 L_{elemtype} + w_4 L_{zindex}$$

where: $w_i$ represents weights assigned to the loss components.

For example, a character count loss is a modified L1 loss and is representable as:

$$L_{charcnt} = \frac{1}{charcnt_{max-loss} * N_{type=3}} \sum_1^N f_{tm1}(P_{label}) * (f_{vm1}(P_{diff}) * P_{diff} + (1 - f_{vm1}(P_{diff})) * charcnt_{max-loss})$$

where: every other prediction apart from a character count token is equally undesirable, so the embedding module 204 first uniformly sets the predictions to $\tilde{P}_{token} = f_{tm1}(P_{token}) * P_{token} + (1 - f_{tm1}(P_{token})) * M$ where a token mask function is $$f_{tm1}(x) = \begin{cases} 1, & \text{type } (x) = 3 \\ 0, & \text{otherwise} \end{cases}$$

and M is an arbitrarily large value. The L1 differences on new values, $P_{diff} = |\tilde{P}_{token} - P_{label}|$, above a maximum character count difference threshold, $t_{charcnt} = idx_{bin_{max}} - idx_{bin_{min}}$, are set to a same value, $charcnt_{max-loss} = t_{charcnt} + \eta$. The embedding module 204 chooses M such that $M - idx_{bin_{max}} > t_{charcnt}$. For stable training, the embedding module 204 normalizes the loss function by dividing with $charcnt_{max-loss}$. A value mask function is given by $$f_{vm1}(x) = \begin{cases} 1, & x \le t_{charcnt} \\ 0, & x > t_{charcnt} \end{cases}.$$

In an example, an element type loss is also a modified L1 loss which is representable as:

$$L_{elmtype} = \frac{1}{etype_{max-loss} * N_{type=s}} \sum_1^N f_{tm2}(P_{label}) * (f_{vm2}(dP) * dP + (1 - f_{vm2}(dP)) * etype_{max-loss})$$

where: all other predictions besides element labels are equally undesirable, so the embedding module 204 maps predicted values to new ones. Let dimg_text, dshape_text, and dimg_shape be L1 distances between the new values of the image/text, shape/text, and image/shape, respectively. The mapping values are selected such that dimg_text=dshape_text and dimg_shape<dimg_text. The new values are of a form xy where x and y are digits because the constraints cannot be modeled in a one-dimensional space. This two-digit number represents a point in a two-dimensional space, which allows the constraints to be fulfilled. The new values which have constraints that |y1−y3|=|y2−y3| (and M is an arbitrarily large value) are given by $$\tilde{P}_a = \begin{cases} x_1 y_1, & \text{category}(a) = \text{image} \\ x_1 y_2, & \text{category}(a) = \text{shape} \\ x_2 y_3, & \text{category}(a) = \text{text} \\ M, & \text{otherwise} \end{cases}$$

and a token distance function d is given by $d(x_a,y_a,x_b,y_b)=|x_a-x_b|*10+|y_a-y_b|$ and $dP=d(\tilde{P}_{token},\tilde{P}_{label})$, $etype_{max-loss}$ is a constant such that $etype_{max-loss} > d_{img-text}$, a token mask function is $$f_{tm2}(x) = \begin{cases} 1, & \text{type } (x) = 2 \\ 0, & \text{otherwise} \end{cases}$$

and a value mask function is $$f_{vm2}(x) = \begin{cases} 1, & x \le d_{img-text} \\ 0, & x > d_{img-text} \end{cases}.$$

The embedding module 204 trains the matching network 502 using a Word Piece tokenizer in one example. In this example, special tokens of the design structure language 304 are masked during training. For example, the embedding module 204 trains the matching network 502 on the augmented training data to generate output tokens using an AdamW optimizer starting from a learning rate of 5e-5 with a linear learning rate decay and a per device batch size of 8. In one example, the embedding module 204 trains the matching network 502 for 250000 steps.

Instead of averaging output tokens generated by the trained matching network 502, the embedding module 204 leverages the token module 504 to use a Vector of Locally Aggregated Descriptors which captures token distribution. For example, the token module 504 assigns each output token to a closest cluster of vocabulary size k (e.g., k is typically 32 or 64 for coarse clusters). A dictionary is obtained using a clustering algorithm (e.g., k-means).

For each of the k clusters, residuals (vector differences between descriptors and cluster centers) are accumulated and K sums of residuals are concatenated into a single k×D dimensional descriptor:

$$v_i = \sum_{t \in T}(x_t - c_i)$$

where: $v_i$ represents the embedding vector; and $c_i$ represents token cluster i.

The embedding module 204 generates the embedding data 212 using the token module 504 such that the embedding data 212 describes an embedding that corresponds to the input digital template 302. The search module 206 receives and processes the embedding data 212 and the template data 118 to generate candidate data 214. To do so in one example, the search module 206 computes distances in an embedding space between the embedding that corresponds to the input digital template 302 and embeddings described by the template data 118 corresponding to digital templates included in the template repository.

In some examples, the search module 206 computes the distances in the embedding space as cosine distances (e.g., based on cosine similarity) between the embedding that corresponds to the input digital template 302 and the embeddings corresponding to the digital templates included in the template repository. In other examples, the search module 206 computes the distances in the embedding space as Manhattan distances, Hamming distances, Minkowski distances, Euclidean distances, and so forth. The search module 206 identifies a subset of the embeddings described by the template data 118 based on the computed distances in the embedding space.

In one example, the search module 206 identifies the subset of embeddings based on a threshold distance in the embedding space such as by including all embeddings described by the template data 118 which are less than the threshold distance from the embedding that corresponds to the input digital template 302 within the subset. In other examples, the search module 206 identifies the subset of embeddings as including a top N embeddings of the embeddings described by the template data 118 which have smallest distances from the embedding that corresponds to the input digital template 302. It is to be appreciated that in various examples, the top N embeddings includes three embeddings, five embeddings, 10 embeddings, 15 embeddings, etc.

In an example, the search module 206 identifies the subset of embeddings from a test dataset which is constructed by filtering the template data 118 to exclude embeddings that correspond to digital templates having less than a threshold number t of design elements. In this example, the search module 206 randomly selects at least one embedding for inclusion in the test dataset and includes at most a fraction of the filtered embeddings (e.g., at most 1 percent) in the test dataset. For example, the search module 206 constructs the test dataset such that the dataset is representative of the template data 118.

Figure 6:
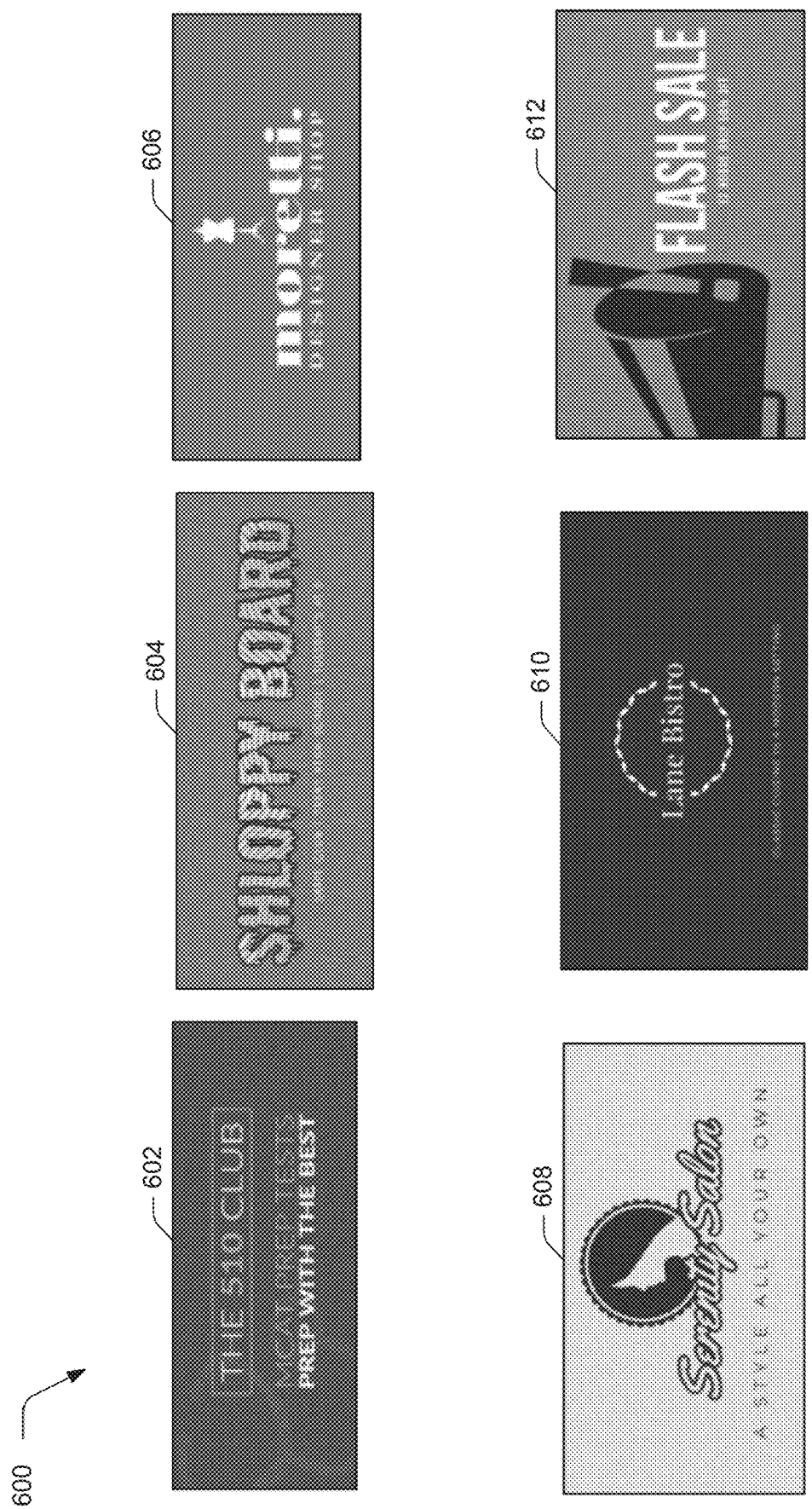
FIG. 6 illustrates a representation of digital templates corresponding to embeddings identified based on an embedding that corresponds to an input digital template.

FIG. 6 illustrates a representation 600 of digital templates corresponding to embeddings identified based on an embedding that corresponds to an input digital template. The representation 600 includes digital templates 602-612 which each correspond to an embedding included in the subset of embeddings identified based on the computed distances in the embedding space. As shown, each of the digital templates 602-612 is structurally similar to the input digital template 302. For instance, each of the digital templates 602-612 includes two text elements and a digital image.

In an example, the search module 206 generates the candidate data 214 as describing the digital templates 602-612 and the input digital template 302. The display module 208 receives the candidate data 214, and the display module 208 processes the candidate data 214 to generate digital templates having the set of design elements included in the input digital template 302 arranged in layouts of the digital templates 602-612. To do so in one example, the display module 208 represents the input digital template 302 as a query $Q=\{Q_1, \ldots, Q_N\}$ where $Q_I$ represents the design elements (the digital image and the two text elements) included in the input digital template 302. The display module 208 represents each of the digital templates 602-612 as $T=\{T_1, \ldots T_M\}$ where $T_I$ represents extracted design elements from a corresponding one of the digital templates 602-612.

For each $(Q_j,T_i)$ pair, the display module 208 computes a translation score $d_{ij}$ which penalizes mismatches between design elements of different types, differences between character counts of text elements, differences between aspect ratios of digital images, and bounding box size dissimilarities. The display module 208 minimizes $e(Q,T)=\Sigma_{i=1}^{N}d(T_i,Q_j)$ where d( ) denotes Euclidean distance and $Q_j$ represents the matched design element for the design element $T_i$. In some examples, the display module 208 constructs a complete bipartite graph for each of the digital templates 602-612 having leftmost nodes representing the input digital template 302 and rightmost nodes representing one of the digital templates 602-612. In these examples, the display module 208 solves a minimum bipartite matching problem using a matching algorithm, e.g., the Jonker-Volgenant algorithm.

Figure 7:
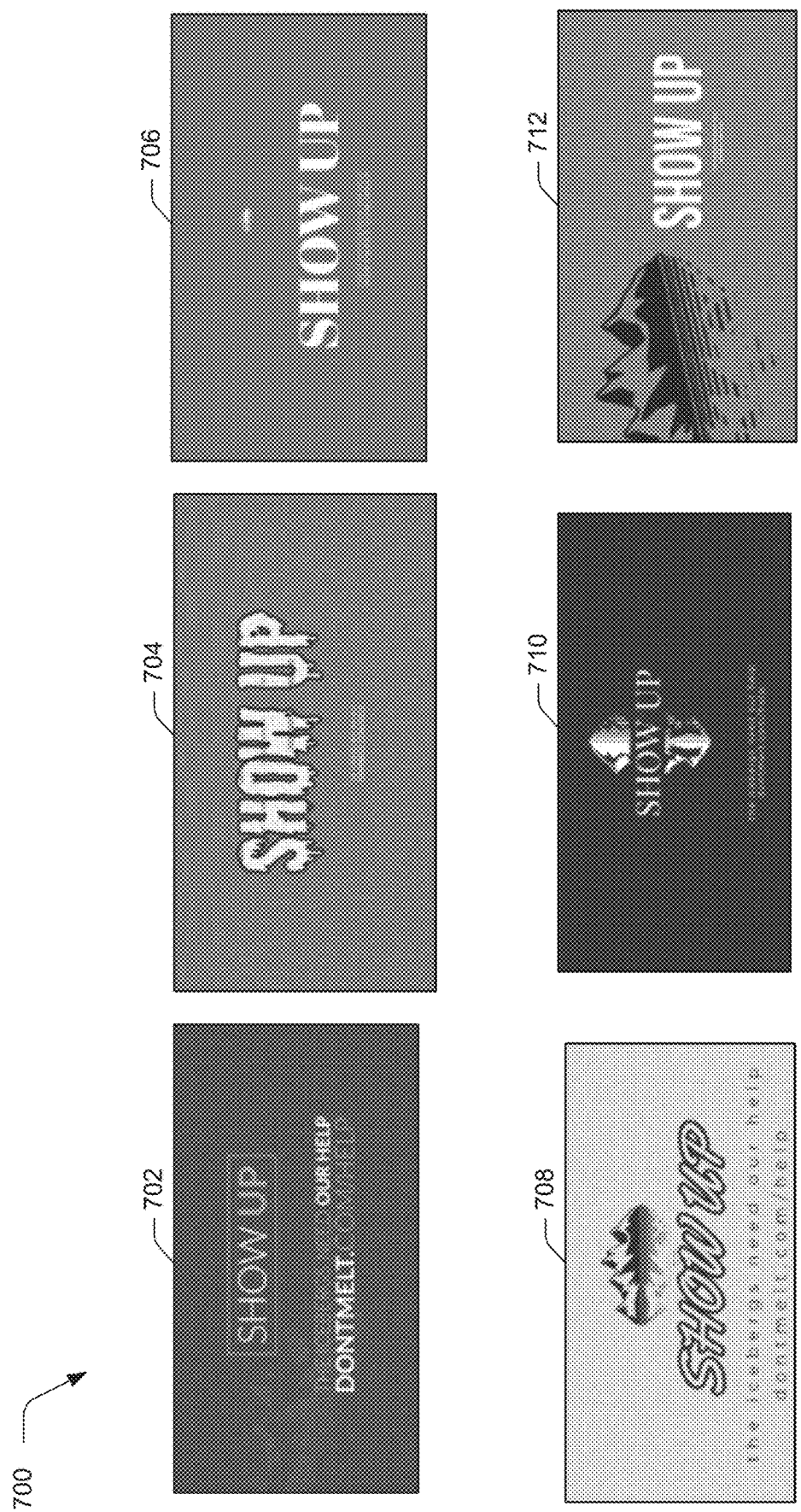
FIG. 7 illustrates a representation of digital templates generated using structure-based matching.

FIG. 7 illustrates a representation 700 of digital templates generated using structure-based matching. As shown in the representation 700, the display module 208 generates digital templates 702-712 for display in a user interface such as the user interface 132. Each of the digital templates 702-712 includes the first text element having text that states "SHOW UP" from the input digital template 302, the second text element having text that states "THE ICEBERGS NEED OUR HELP DONTMELT.COM/HELP" from the input digital template 302, and the digital image that depicts the iceberg from the input digital template 302. Additionally, each of the digital templates 702-712 is aesthetically pleasing because the display module 208 generates the digital templates 702-712 based on the digital templates 602-612 which are created by digital artists.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 8:
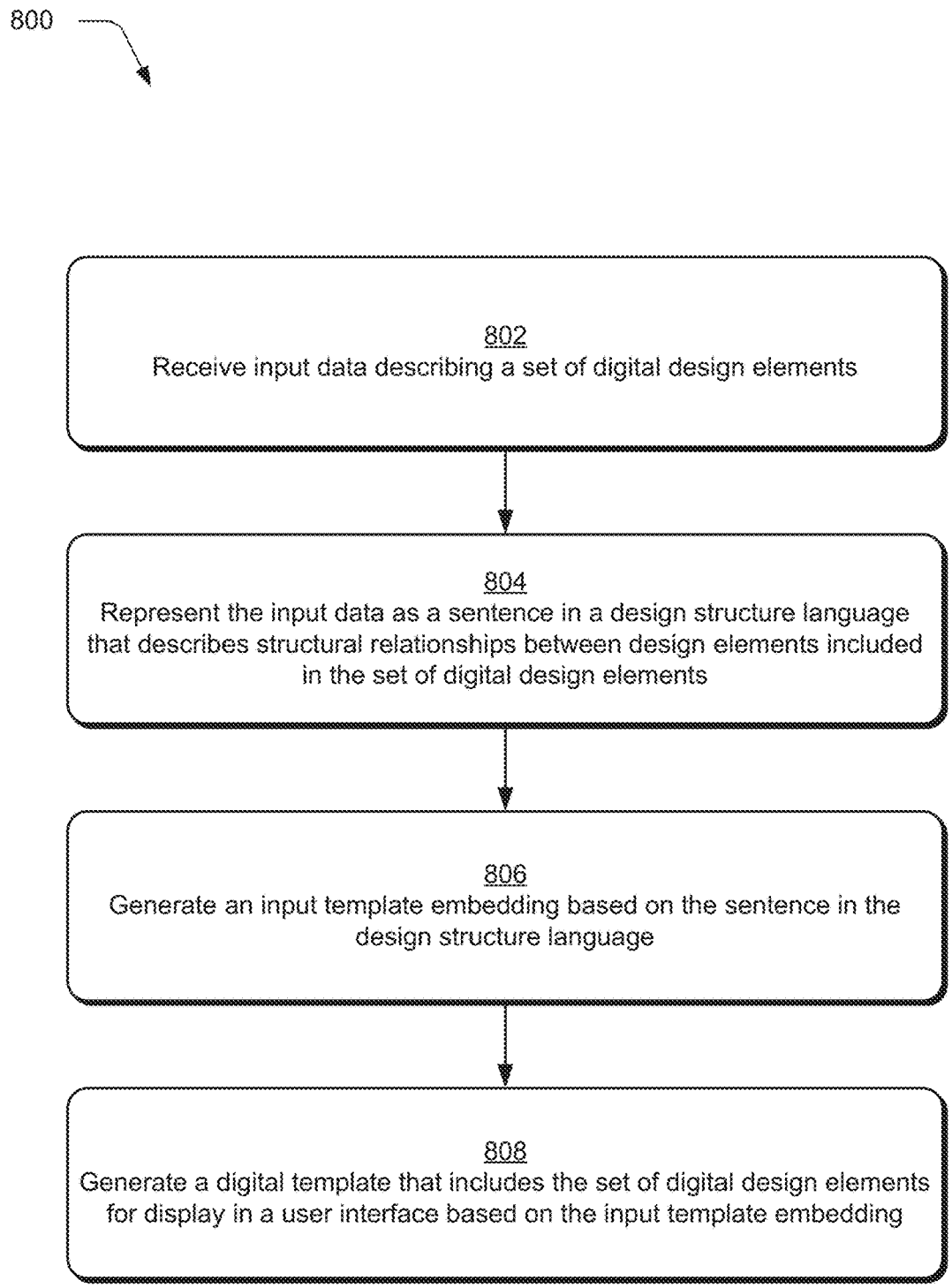
FIG. 8 is a flow diagram depicting a procedure in an example implementation in which input data is received as describing a set of digital design elements and a digital template is generated that includes the set of digital design elements.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which input data is received as describing a set of digital design elements and a digital template is generated that includes the set of digital design elements.

Input data is received describing a set of digital design elements (block 802). For example, the computing device 102 implements the template module 110 to receive the input data. The input data is represented as a sentence in a design structure language that describes structural relationships between design elements included in the set of digital design elements (block 804). The template module 110 represents the input data as the sentence in the design structure language in some examples.

An input template embedding is generated based on the sentence in the design structure language (block 806). In an example, the computing device 102 implements the template module 110 to generate the input template embedding based on the sentence in the design structure language. A digital template is generated that includes the set of digital design elements for display in a user interface based on the input template embedding (block 808). In one example, the template module 110 generates the digital template that includes the set of digital design elements for display in the user interface.

FIGS. 9A, 9B, and 9C illustrate examples of templates generated using structure-based matching. FIG. 9A illustrates a representation 900 of a first example of templates generated using structure-based matching. FIG. 9B illustrates a representation 902 of a second example of templates generated using structure-based matching. FIG. 9C illustrates a representation 904 of a third example of templates generated using structure-based matching.

With reference to FIG. 9A, the representation 900 includes an input digital template 906 described by the input data 114. As shown, the input digital template 906 includes two text elements, a digital image (as a background), and a scalable vector graphic. The template module 110 represents the input digital template 906 as a sentence in the design structure language and then generates an embedding in the embedding space that corresponds to the input digital template 906. The template module 110 computes distances between the embedding that corresponds to the input digital template 906 and embeddings described by the template data 118.

For instance, the template module 110 identifies a subset of the embeddings described by the template data 118 which includes embeddings corresponding to digital templates 908. The template module 110 generates digital templates 910 based on the input digital template 906 and the digital templates 908. The digital templates 910 include the two text elements, the digital image (as a background), and the scalable vector graphic included in the input digital template 906 arranged in layouts of the digital templates 908.

The representation 902 illustrated in FIG. 9B includes an input digital template 912 described by the input data 114. The input digital template 912 includes two text elements and a digital image. The template module 110 represents the input digital template 912 as a sentence in the design structure language, and the template module generates an embedding in the embedding space that corresponds to the input digital template 912 based on the sentence in the design structure language. In one example, the template module 110 computes distances between the embedding that corresponds to the input digital template 912 and embeddings described by the template data 118.

For example, the template module 110 identifies a subset of the embeddings described by the template data 118 based on the computed distances which includes embeddings corresponding to digital templates 914. Each of the digital templates 914 includes two text elements and a digital image in this example. The template module 110 generates digital templates 916 based on the input digital template 912 and the digital templates 914. As shown, the digital templates 916 include the two text elements and the digital image from the input digital template 912 arranged in layouts of the digital templates 914.

With reference to FIG. 9C, the representation 904 includes an input digital template 918 described by the input data 114. For example, the input digital template 918 includes two text elements, a digital image (as a background), and a scalable vector graphic. The template module 110 represents the input digital template 918 as a sentence in the design structure language and then generates an embedding in the embedding space that corresponds to the input digital template 918 (e.g., using the embedding module 204). The template module 110 computes distances between the embedding that corresponds to the input digital template 918 and embeddings described by the template data 118.

For instance, the template module 110 identifies a subset of the embeddings described by the template data 118 based on the computed distances which includes embeddings corresponding to digital templates 920. The template module 110 generates digital templates 922 based on the input digital template 918 and the digital templates 920. The digital templates 922 each include the two text elements, the digital image (as a background), and the scalable vector graphic included in the input digital template 918 arranged in layouts of the digital templates 920.

Example System and Device

Figure 10:
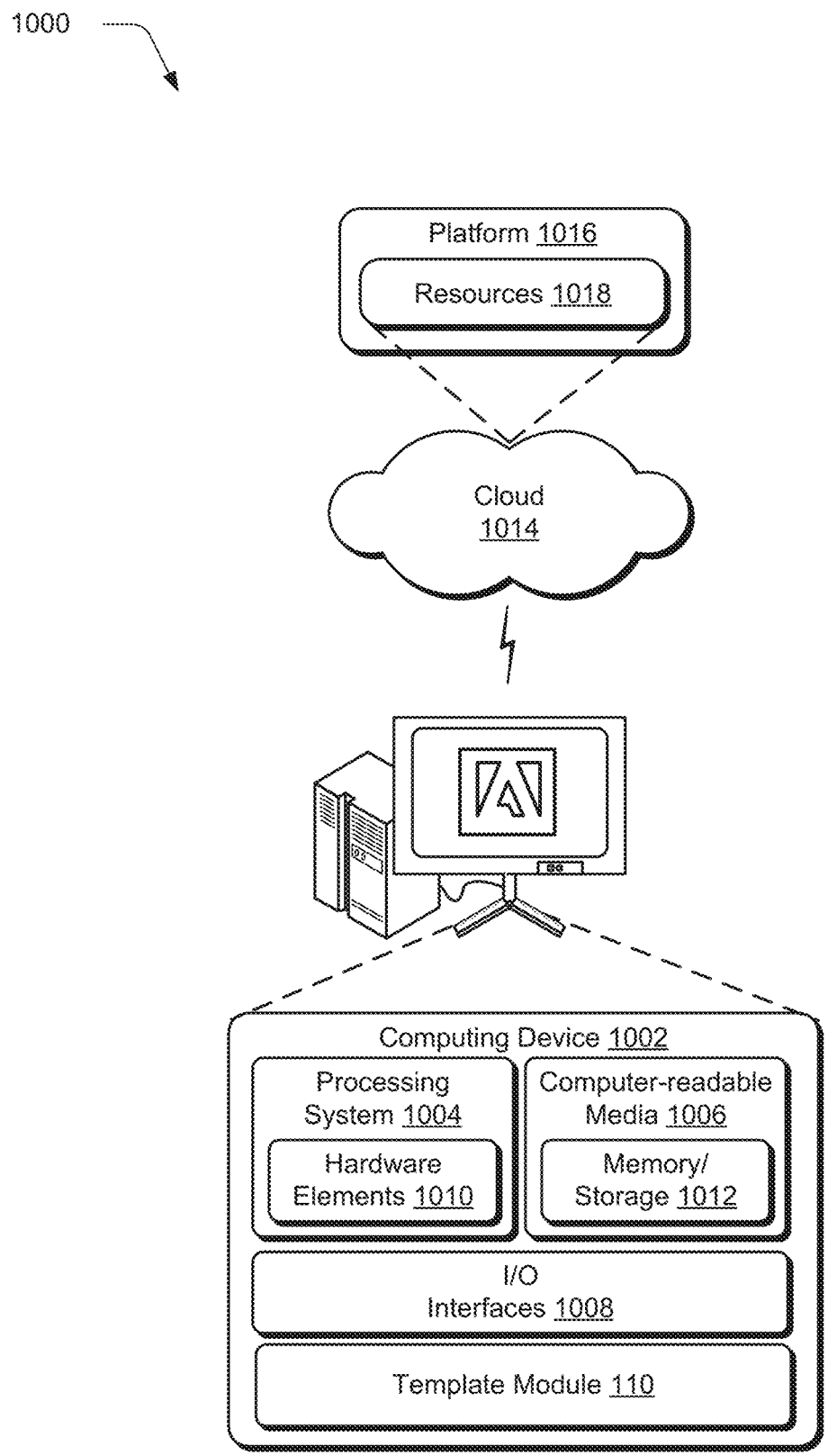
FIG. 10 illustrates an example system that includes an example computing device that is representative of one or more computing systems and/or devices for implementing the various techniques described herein.

FIG. 10 illustrates an example system 1000 that includes an example computing device that is representative of one or more computing systems and/or devices that are usable to implement the various techniques described herein. This is illustrated through inclusion of the template module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although implementations of systems for generating templates using structure-based matching have been described in language specific to structural features and/or methods, it is to be understood that the appended claims are not necessarily limited to the specific features or methods described. Rather, the specific features and methods are disclosed as example implementations of systems for generating templates using structure-based matching, and other equivalent features and methods are intended to be within the scope of the appended claims. Further, various different examples are described and it is to be appreciated that each described example is implementable independently or in connection with one or more other described examples.

What is claimed is:

1. A method comprising:
    receiving, by a computing device, input data describing a set of digital design elements;
    representing, by the computing device, the input data as a sentence in a design structure language that describes structural relationships between design elements included in the set of digital design elements;
    generating, by the computing device, an input template embedding by a machine learning model based on the sentence in the design structure language, the machine learning model trained to receive sentences in the design structure language as inputs and generate embeddings in a latent space for the sentences in the design structure language as outputs; and
    generating, by the computing device, a digital template that includes the set of digital design elements for display in a user interface based on the input template embedding.

2. The method as described in claim 1, further comprising identifying a candidate template embedding that corresponds to the digital template based on the latent space.

3. The method as described in claim 1, wherein a candidate template embedding that corresponds to the digital template is generated using the machine learning model.

4. The method as described in claim 1, wherein the input template embedding is generated using a Vector of Locally Aggregated Descriptors.

5. The method as described in claim 1, wherein the sentence in the design structure language includes a sequence for metadata of the set of digital design elements and a sequence for content of the set of digital design elements.

6. The method as described in claim 1, wherein the design structure language encodes semantic information about the design elements.

7. The method as described in claim 1, wherein the design structure language encodes group membership for sequences of the design elements.

8. The method as described in claim 1, wherein the set of digital design elements is mapped to the digital template using a complete bipartite graph.

9. The method as described in claim 1, wherein the design elements include at least one of digital images, text, or scalable vector graphics.

10. The method as described in claim 9, wherein the input template embedding is generated using a machine learning model trained on training data to minimize a loss function that penalizes incorrect predictions of digital images as text more than incorrect predictions of digital images as scalable vector graphics.

11. A system comprising:
    a memory component; and
    a processing device coupled to the memory component, the processing device to perform operations comprising:
        receiving input data describing a set of design elements;

representing the input data as a sentence in a design structure language that describes structural relationships between design elements included in the set of design elements;

generating an input template embedding based on the sentence in the design structure language; and identifying a digital template that includes the set of digital design elements for display in a user interface based on the input template embedding based on a distance between a template embedding that corresponds to the digital template and the input template embedding in a latent space, the template embedding and the input template embedding generated using a machine learning model trained on training data to receive sentences in the design structure language as inputs and generate embeddings in the latent space for the sentences in the design structure language as outputs.

12. The system as described in claim 11, wherein the design structure language encodes semantic information about the design elements.

13. The system as described in claim 11, wherein the design structure language encodes group membership for sequences of the design elements.

14. The system as described in claim 11, wherein the input template embedding is generated using a Vector of Locally Aggregated Descriptors.

15. The system as described in claim 11, wherein the sentence in the design structure language includes a sequence for metadata of a set of the design elements and a sequence for content of the set of design elements.

16. A non-transitory computer-readable storage medium storing executable instructions, which when executed by a processing device, cause the processing device to perform operations comprising:

receiving input data describing an input digital template having a set of design elements in a first layout;

representing the input data as a sentence in a design structure language that describes structural relationships between design elements included in the set of design elements;

generating an input template embedding based on the sentence in the design structure language, the generating using a machine learning model trained on training data to receive sentences in the design structure language as inputs and generate embeddings in a latent space for the sentences in design structure language as outputs; and generating an output digital template having the set of digital design elements in a second layout for display in a user interface based on the input template embedding and a candidate template embedding that corresponds to the output digital template as generated using the machine learning model.

17. The non-transitory computer-readable storage medium as described in claim 16, wherein the candidate template embedding is identified based on a distance between the input template embedding and the candidate template embedding in a latent space.

18. The non-transitory computer-readable storage medium as described in claim 16, wherein the training data is augmented by changing a relative Z-index of design elements included in digital templates used to generate the training data.

19. The non-transitory computer-readable storage medium as described in claim 16, wherein the sentence in the design structure language includes a sequence for metadata of a set of the design elements and a sequence for content of the set of design elements.

20. The non-transitory computer-readable storage medium as described in claim 16, wherein the design structure language encodes semantic information about the design elements and encodes group membership for sequences of the design elements.

* * * * *